United States Patent [19]

Knudsen et al.

[11] Patent Number: 5,284,163
[45] Date of Patent: Feb. 8, 1994

[54] MEANS FOR USE AS AN AID TO STOP SMOKING OR FOR USE IN NON-SMOKING AREAS

[76] Inventors: Svein Knudsen, Lindlokka 50, N-1370 Asker; Tor Rasmussen, S. P. Munthe Kaas vei 17, N-1346 Gjettum, both of Norway

[21] Appl. No.: 778,952
[22] PCT Filed: Jul. 16, 1990
[86] PCT No.: PCT/NO90/00119
§ 371 Date: Jan. 10, 1992
§ 102(e) Date: Jan. 10, 1992
[87] PCT Pub. No.: WO91/01656
PCT Pub. Date: Feb. 21, 1991

[30] Foreign Application Priority Data

Jul. 31, 1989 [NO] Norway ................. 893095

[51] Int. Cl.$^5$ .......................................... A24F 47/00
[52] U.S. Cl. ................... 131/270; 131/359; 131/369
[58] Field of Search ............... 131/270, 273, 354, 359, 131/369; 426/3, 5

[56] References Cited

U.S. PATENT DOCUMENTS

| 3,877,468 | 4/1975 | Lichtneckert et al. | 131/270 X |
| 4,311,691 | 1/1982 | Fichera | 131/270 X |
| 4,317,837 | 3/1982 | Kehoe et al. | 131/354 X |
| 4,736,755 | 4/1988 | Oldham et al. | 131/270 |
| 4,753,805 | 6/1988 | Cherukuri et al. | 426/5 |
| 4,774,971 | 10/1988 | Vieten | 131/273 |
| 4,800,903 | 1/1989 | Ray et al. | 131/273 |
| 4,807,648 | 2/1989 | Breckwoldt | 131/359 |
| 5,048,544 | 9/1991 | Mascarelli | 131/270 |

FOREIGN PATENT DOCUMENTS

| 0150077 | 7/1985 | European Pat. Off. . |
| 0270738 | 6/1988 | European Pat. Off. . |
| 0321943 | 6/1989 | European Pat. Off. . |

OTHER PUBLICATIONS

Chemical Abstracts (9th Coll., 10th Coll., 1977–1981 Chem. Substance Index; 1982–1986 Chem. Substance Index; 11th Coll.).
"Nicotine Gums, Sprays and Patches", The Pharmaceutical Journal, Feb. 25, 1989.

Primary Examiner—Vincent Millin
Assistant Examiner—William M. Pierce
Attorney, Agent, or Firm—Birch, Stewart Kolasch & Birch

[57] ABSTRACT

A smoke-free cigarette substitute containing in a tubular sleeve a nicotine-containing carrier, in granular or powder form, which is drawn into the oral cavity of the user, thus dispensing nicotine into the mouth.

5 Claims, 1 Drawing Sheet

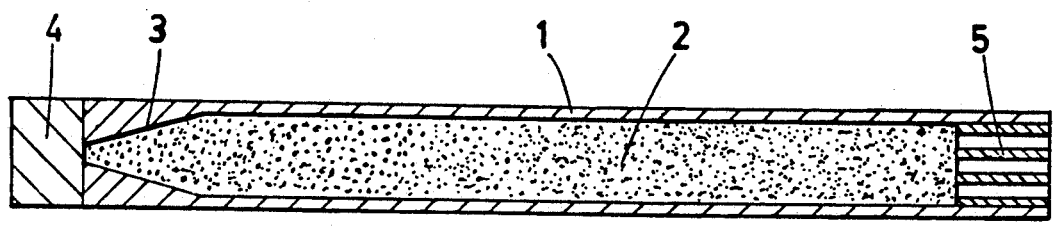

MEANS FOR USE AS AN AID TO STOP SMOKING OR FOR USE IN NON-SMOKING AREAS

The invention relates to a means for use as an aid to stop smoking or for use in non-smoking areas. During the last years increased attention has been brought to the very large disadvantages connected with smoking, both for the smoker's health as also for his surroundings. The dependency of smoking and tobacco products is not only connected to the content of nicotine in the products and the receipt of nicotine, but also to the psychological and social relations connected to habits and rituals in connection with smoking. The most widespread form of smoking is smoking cigarettes and cigars, by which the nicotine containing smoke is transferred directly to the blood through the lungs. Both the taste and aroma are important elements of the smoking experience, and therefore different types of tobacco with different aroma and taste are produced. On the other hand, many people are very sensitive to the aroma, and the smell of smoke may be remaining for instance in textiles for a long time.

Another kind of nicotine consumption is the use of snuff and chew tobacco. By chewing nicotine is dispensed in the mouth and is taken up by the blood in the oral cavity. This form for taking up the nicotine has been less accepted and is regarded as unaesthetic in the more urban and fashion-setting environments. The use of snuff and chew tobacco is most widespread in Scandinavia and on the North American continent.

The environmental problems and pollution problems which are connected to smoking have led to prohibition against smoking in continuously more areas and the establishment of smoke-free areas. This and also the problem of passive smoking, including in private homes, has actualized research and development of smoke-free solutions which can be used by persons dependent on nicotine. In addition there has been produced a plurality of different substitutes of cigarettes incorporating nicotine instead of tobacco, and by which the cigarette substitute is not intended to burn. However, none of these solutions have become popular on the market, and several of the proposed solutions are also complicated to produce, which is disadvantageous, especially as they are not giving any satisfactory experience of "smoking". Examples of such cigarettes may be found in the U.S. Pat. Nos. 4,676,259, 4,284,089, 4,736,755 and the European patent application No. 270738. The main principle consists in inhaling cold vapour or nicotine containing air which is dispensing nicotine to the lungs. Salts of nicotine/fluid nicotine have been used in several connections, either alone or together with tobacco.

As an aid to prevent or stop smoking, nicotine containing substances in the form of chewing gums or suction tablets have also been produced and developed. By chewing or by suction in a controlled process for preventing smoking, a chewing gum or tablet containing either 4 mg or 2 mg nicotine is used, depending on previous consume of cigarettes. These substances are based on nicotine salts and not tobacco. However, experience has shown that such a way of absorbing nicotine does not give the smoker a satisfactory effect, and it has proved that quite a lot of people stop to use chewing gum and tablets and start to smoke again.

The object of the present invention is to provide a means which can be used as substitute for smoking, or for preventing smoking, by which means the influence of the nicotine on the human body is more effective, so that the means is better adapted for use for instance as an aid to stop smoking, and which means also may be used in a smoke-free substitute for cigarettes, and can give the user the same effect of nicotine while he at the same time maintains his psychologic habits consisting in drawing on the cigarette. The means according to the invention shall thus give the smoker a real alternative also in the case he does not want to stop smoking, but where it is still desirable for his surroundings and the environment that no smoke is sent out, so as to achieve a clear improvement of the environment conditions. Examples of such areas are the working sites on offshore platforms and other places where smoking a cigarette can be a hazard to life.

This object of the invention is achieved by a means which is defined in the claims.

The means according to the invention is simple to produce and consists in principle of a nicotine containing substance which can either be present in the form of a tobacco extract or a nicotine containing material of the same type as used in nicotine chewing gum, to which material there has been added a binder of a type which is commonly used in connection with tablets, pastilles and the like, and which in itself has no effect. As such a binder maltodextrin is used, which among others is the basis for vitamin tablets. This agent is not dangerous to take into the mouth, and it is melting by chewing and adding of spit. By adding either tobacco extract or nicotine to maltodextrin or another corresponding agent, a granulate will be achieved, which can constitute the basis for inhalation or which may be drawn into the mouth through a cigarette-like sleeve, or the substance will be usable as a basis for a suction tablet.

In the following the invention will be further described by means of an example illustrating the production of the means according to the invention on the basis of tobacco as a nicotine containing starting material, and by means of an embodiment describing a smoke-free cigarette substitute, in which the means according to the invention has been incorporated.

Such a cigarette substitute has also been illustrated on the enclosed drawing.

EXAMPLE

A means according to the invention, in which tobacco has been used as nicotine material, and by which it is wanted a means in granular form, can be produced in the following manner: Two packages (50 g) compressed tobacco rolls of the chew tobacco type, which is common on the market, is put in ¼ dl water and dissolved during a period of approx. 24 h. Thereby a dark brown liquid of low viscosity is achieved. To this fluid maltodextrin is added until the liquid has been transformed to a mass of high viscosity. This high viscosity mass is heated for about 12 h at a temperature of approx. 125°–150° C., leading to an evaporation of the water, and a hard "cake" remains. This is crushed in a mortar till the mass has achieved a suitable granular form with a golden, light brown colour. The particulate mass has a taste of tobacco and contains nicotine. This granulate can be used in a smoke-free cigarette substitute which has been illustrated schematically in a section view on the drawing. The cigarette substitute can be given a form and an appearance close up to that of a normal cigarette. The product consists of a sleeve 1 with an outer appearance of the cigarette, or if wanted, for instance a cigarillo or a cigar with respect to width, feeling and total appearance. As an alternative, another design may of course also be used, which for instance is reflecting that there is used a smoke preventing means or a smoke-free cigarette. The tube-shaped sleeve 1 has been filled with the above described granulate substance which has been given the reference number 2. At the mouth end of the sleeve 1 there is provided a funnel-formed orifice 3 which serves to regulate the outlet of the granulate when "smoking" the cigarette substitute. Through the funnel-like orifice 3 a nicotine containing granulate may be drawn into the mouth in suitable doses. The intake dose into the mouth can also be regulated both by the frequency of drawing and the force of drawing, just as by a cigarette. The concentration rate of nicotine added to the granulate can also be controlled by the use of other rates of additives than those described above, so that by reducing the smoking it will be possible step-wise to reduce the concentration of the nicotine receipt.

The funnel-like end 3 of the sleeve has been sealed with a mass or a plug of gum base, which on the drawing has the reference number 4. The other end of the sleeve has been closed by a perforated plug 5 which keeps the granulate 2 positioned in the tube sleeve 1 and at the same time allows air to enter the sleeve by the suction or drawing in the other end, so that drawing will be as similar as possible to the drawing on a tobacco cigarette.

When using the cigarette substitute, the plug 4 of gum base is bitten off and is kept in the mouth as a chewing gum. The user is drawing on the cigarette and receives a dose of the nicotine containing granulate 3 in the mouth. This granulate may then be chewed into the gum base, and the nicotine will then by secretion in the oral cavity go directly into the blood and give the wanted effect. By use of the means according to the invention in this form of cigarette substitute the process of getting rid of the smoking habit will be easier, and such "cigarettes" will also be usable in smoke-free areas and at sites at which care is taken to avoid passive smoking, and on inflammable sites.

In the above some possibilities of use and preferred embodiments for the means according to the invention are described. However, it should be clear that many modifications will be possible within the scope of the invention. If for instance a stronger effect is wanted, it will be possible to combine the effect of a suction pastille with a cigarette substitute, for instance by incorporating an additional amount of nicotine in the gum base.

The invention has been described with the use of maltodextrin as carrier material or basis material. It should, however, be self-evident that other maltose or dextrin products or similar products will be usable.

It should also be clear that another alternative for provision of the means could be in pastilles or directly in chewing gum, in which the tobacco or nicotine substances will become available during suction/chewing. The production of such pastilles or chewing gum may be made in a simple, known manner. Thereby it is important to adjust a wanted dose so that the amount of nicotine corresponding to a cigarette will be resolved during approximately the same time as normally used for smoking a cigarette.

I claim:

1. A smoke-free cigarette substitute for use as an aid to stop smoking or for use in non-smoking areas, comprising a nicotine containing carrier which is provided in a tubular sleeve (1), whereby an air-permeable plug (5) has been incorporated in one end of the sleeve, characterized in that said nicotine containing carrier comprises a binder to which has been added a nicotine containing material and optionally other aromatic agents, and that the other end of the sleeve (1) has been provided with a funnel-shaped suction orifice (3) and a gum base (4), which orifice allows a wanted dose of said nicotine containing carrier (2) to reach the oral cavity of the user by drawing in, and that said carrier (2) after reaching the oral cavity is intended to be chewed together with the gum base (4) and agglomerate with said gum, and in this way dispense nicotine in the mouth.

2. The cigarette substitute according to claim 1, characterized in that nicotine containing material also has been incorporated in the gum base plug in the sleeve.

3. The cigarette substitute of claim 1 wherein said carrier is granular in form.

4. The cigarette substitute of claim 1 wherein said carrier is a powder in form.

5. The cigarette substitute of claim 1 wherein said binder is selected from the group consisting of maltose, dextrin or maltodextrin.

* * * * *